United States Patent
Stempeck

[11] 3,900,855
[45] Aug. 19, 1975

[54] EXPOSURE CONTROL SYSTEM AND METHOD

[75] Inventor: John W. Stempeck, Belmont, Mass.

[73] Assignee: Polaroid Corporation, Cambridge, Mass.

[22] Filed: Nov. 12, 1973

[21] Appl. No.: 414,887

[52] U.S. Cl. .................... 354/29; 354/38; 354/44; 354/50; 354/51
[51] Int. Cl. .......................................... G03b 7/08
[58] Field of Search ............ 354/24, 50, 60, 29, 38, 354/43, 44, 51

[56] References Cited
UNITED STATES PATENTS

| | | | |
|---|---|---|---|
| 3,439,595 | 4/1969 | Kiper | 95/10 |
| 3,611,159 | 10/1971 | Florsheim et al. | 354/60 X |
| 3,703,130 | 11/1972 | Watanabe | 354/50 X |
| 3,748,979 | 7/1973 | Wada | 95/10 |
| 3,827,065 | 7/1974 | Wada | 95/10 |

Primary Examiner—Samuel S. Matthews
Assistant Examiner—Russell E. Adams
Attorney, Agent, or Firm—Gerald L. Smith; David L. Thornton

[57] ABSTRACT

An exposure control system for photographic apparatus of a variety utilizing a pulse driven stepper motor to drive the light regulating elements of an exposure mechanism. The control system utilizes an exposure evaluating network the output signal from which is converted to binary form and compared against the output of counter means driven at predetermined frequencies. A first stable one of these frequencies is utilized while the stepper motor drives the exposure mechanism elements toward open aperture orientations. At maximum aperture width, the system alters the pulse drive to the counter means in a manner progressively lowering the frequency rate thereof. Such an arrangement accommodates for the alteration of exposure definition by the exposure mechanism from a dynamic to a static status.

23 Claims, 7 Drawing Figures

EXPOSURE CONTROL SYSTEM AND METHOD

BACKGROUND OF THE INVENTION

Automatic exposure control systems for photographic devices basically evaluate scene brightness, weight this evaluation with respect to the sensitometric characteristics of the film being exposed and regulate one or more variable exposure control parameters such as exposure interval and aperture size in correspondence with the weighted evaluation. Scene brightness evaluation for the systems is performed with light sensing networks using one or more photosensitive elements.

Dual exposure parameter automatic control has been considered ideal for use within fully automated but highly compact cameras. One such camera as is described in U.S. Pat. No. 3,714,879 provides for automated reflex operation requiring that its camera shutter remain normally open, defining full aperture width for purposes of viewing and focusing. At the commencement of a photographic cycle for the camera, the shutter thereof is required to fully close and remain closed while the optical path converts to an exposure mode orientation. Following such conversion, the shutter is required to carry out two parameter exposure regulation, following which the blades thereof remain closed as the components of the camera are automatically driven to alter the optical path to its initial viewing-focusing mode orientation. When the latter conversion is completed, the shutter mechanism is called upon again to reassume its open condition exhibiting maximum aperture width.

One shutter structure deriving such light regulating performance is described in U.S. Pat. No. 3,641,889. This shutter utilizes two coacting blades or elements which are reciprocably driven by a solenoid operating in conjunction with relatively light spring loadings. As the blades of the shutter are driven open by the noted springs, progressively enlarging aperture widths are defined both over the taking optics of the camera and over the detecting elements of a light sensing network. The latter "sweep" feature serves to insert blade position or aperture data to the control system and takes place contemporaneously with the exposure of a film unit. When appropriate light values are reached, the solenoid is energized to rapidly drive the blades to a light blocking orientation. With the arrangement, dual parameter exposure control is provided utilizing a compact mechanism operating within conservative energy demands.

Another approach to providing such shutter performance is described in a copending application for U.S. patent by I. Erlichman, entitled "Non-Cocking Springless Shutter Developing Two Parameter Exposure Regulation" Ser. No. 362,926 filed May 22, 1973 and assigned in common herewith, as well as in an application for U.S. patent by R. Kee, Ser. No. 362,664 entitled "Exposure Control System For Photographic Apparatus" filed May 22, 1973 now abandoned and replaced by application Ser. No. 508,723 filed Sep. 23, 1974 and also assigned in common herewith. These applications describe an exposure control system utilizing two coacting blades as described above which are driven from a stepper motor. The shutter blades are configured to be directly driven from the output of the stepper motor and move, when so driven, in synchronism and correspondence to define progressively widening aperture widths over the taking optical path of the camera. Similar to the structure described in the noted patent, the blades also are formed having secondary openings which provide the corresponding sweep feature wherein blade position data or aperture value data is inserted into the control circuitry. As before, shutter blade movement is made contemporaneously with exposure evaluation.

In a copending application for U.S. patent by J. W. Stempeck entitled "Exposure Control System" Ser. No. 414,886 filed of even date herewith and assigned in common herewith, a stepper motor driven shutter arrangement is described wherein shutter blade actuation takes place following scene evaluation by a light sensing network or the like. This post-evaluation shutter performance is carried out through the use of an analog-to-digital converter which derives a binary output representative of scene evaluation. Through interacting counting and equality network performance, the stepper motor is driven to cause the shutter blades to define an exposure value corresponding with the output of the converter. Inasmuch as shutter performance follows scene evaluation, no photocell sweep features are available for the insertion of relative blade position data. Because it is desirable that the exposure control system retain a capability of automatically regulating exposures beyond the widest available aperture width and to extended intervals of time, for instance 17 seconds, a technique is needed for accommodating the system to the alteration of blade status from that of dynamic to that of static. Further, the system must practically retain a digital capacity adequate for the noted extended exposure intervals.

SUMMARY

The present invention is addressed to an exposure control system and apparatus of a variety wherein the output of an exposure evaluating network is converted to a digital representation, which representation then is utilized in conjunction with a counter-comparison control arrangement to regulate exposure. Operating in conjunction with a dual parameter exposure control mechanism in which progressively enlarging aperture widths are defined over an exposure opening until an appropriate value of exposure is defined, the system of the invention is characterized by a feature wherein counting rates are altered at such time as a terminal exposure mechanism or shutter element position of maximum aperture width is reached. As a consequence, the system evidences one counting frequency during dynamic, aperture changing performance, and another counting frequency during static performance at a fixed terminal aperture orientation.

Another feature and object of the invention is to provide for a progressively diminishing counting rate during static terminal aperture definition so as to minimize the required digital output capacity of the noted converter digital representation. By so progressively lowering the counting rate, those integrated light quantities or components of an exposure prior to the definition of maximum aperture width are evaluated at higher frequency rates, while exposure components defined during extended exposure intervals are evaluated at lower frequency rates. Sufficient accuracy of exposure evaluation is retained by the system inasmuch as exposure components evaluated during extended intervals at maximum aperture width represent a relatively smaller portion or fraction of the entire integrated light value of such an exposure. Conversely, the exposure components relatively immediately preceeding maximum aperture width definition represent a more substantial component of exposure value. Accordingly, more accurate, higher frequency counting rates are available to assure system accuracy. The latter counting frequencies, however, are selected having lower rates than those utilized for counting during dynamic performance to accommodate for static aperture conditions. For instance, the rate of light flux admitted at the aperture is not increasing under static aperture definition.

Another object and feature of the invention is to provide an exposure control system of a variety utilizing an exposure regulating technique wherein light regulating elements are movable during an interval of exposure to derive a dynamic definition of aperture values about an exposure opening. As the elements reach a terminal position, they define a static aperture value which is maintained until an interval of exposure is terminated by blocking the exposure opening. The system utilizes an exposure evaluating arrangement, for instance, a light responsive network having an output corresponding with the brightness levels of a scene. An analogue-to-digital converter responds to this scene brightness related output and derives a digital representation of its value. A control arrangement having a counter network operative in synchronization with the movement of the exposure defining elements and which responds to an input pulse train to count the received pulses thereof is utilized to form a digital representation of the number of pulses received. This control arrangement also includes a generator arrangement which derives the noted pulse train input to the counter at one frequency selected in correspondence with the dynamic definition of aperture values established by the exposure elements. The generator arrangement also derives a pulse train input at another frequency selected in correspondence with static definition of aperture by the noted elements. To accommodate for the static light flux input rate, this frequency is lower than that driving the counter during dynamic aperture definition. The system further includes means for terminating an exposure interval when the counter and converter digital representations coincide in value. To maximize converter utilization by minimizing the number capacity of the analogue-to-digital converter, the generator arrangement provides for a progressively diminishing pulse train input frequency to the counter during the noted static aperture definition.

In a preferred embodiment, the system incorporates an exposure mechanism drive in the form of a stepper motor which is energized by a pulse train of predetermined frequency. The output of this motor is coupled with two elements of an exposure mechanism which define progressively varying apertural values as they are moved between a terminal position blocking the passage of light through an exposure opening and another terminal position defining a static aperture of maximum width. Pulse drive to the motor is derived by virtue of a connection slaving it to a counter in a manner driving the motor at a pulse rate representing a sub-frequency of the pulse rate introduced to the counter. The counter operates in conjunction with the digital output or representation of an analogue-to-digital converter which, in turn, derives such representation in response to an evaluation of exposure. When the digital representation at the counter corresponds with that of the converter, the stepper motor is reversed to drive the exposure mechanism elements in a manner terminating the interval of exposure. The system further includes a monitor which blocks pulse transfer to the stepper motor at such time as the noted maximum aperture width position of the exposure mechanism elements is attained. However, pulse train input to the counter is not blocked at this time in the absence of an equality between the digital representation of the converter and the counter. By selectively lowering the frequency input to the counter when static aperture is attained, accommodation for steady state light flux input through the exposure opening is realized. The invention further features an arrangement wherein input pulses to the counter are progressively reduced during that portion of an exposure interval wherein static aperture is defined. As a consequence, more efficient use of the converter capacity is realized.

Other objects of the invention will in part be obvious and will in part appear hereinafter.

The invention accordingly comprises the system and apparatus possessing the construction, combination of elements and arrangement of parts which are exemplified by the following detailed disclosure.

For a fuller understanding of the nature and objects of the invention, reference should be had to the following detailed description taken in connection with the accompanying drawings.

DETAILED DESCRIPTION

Figure 1:
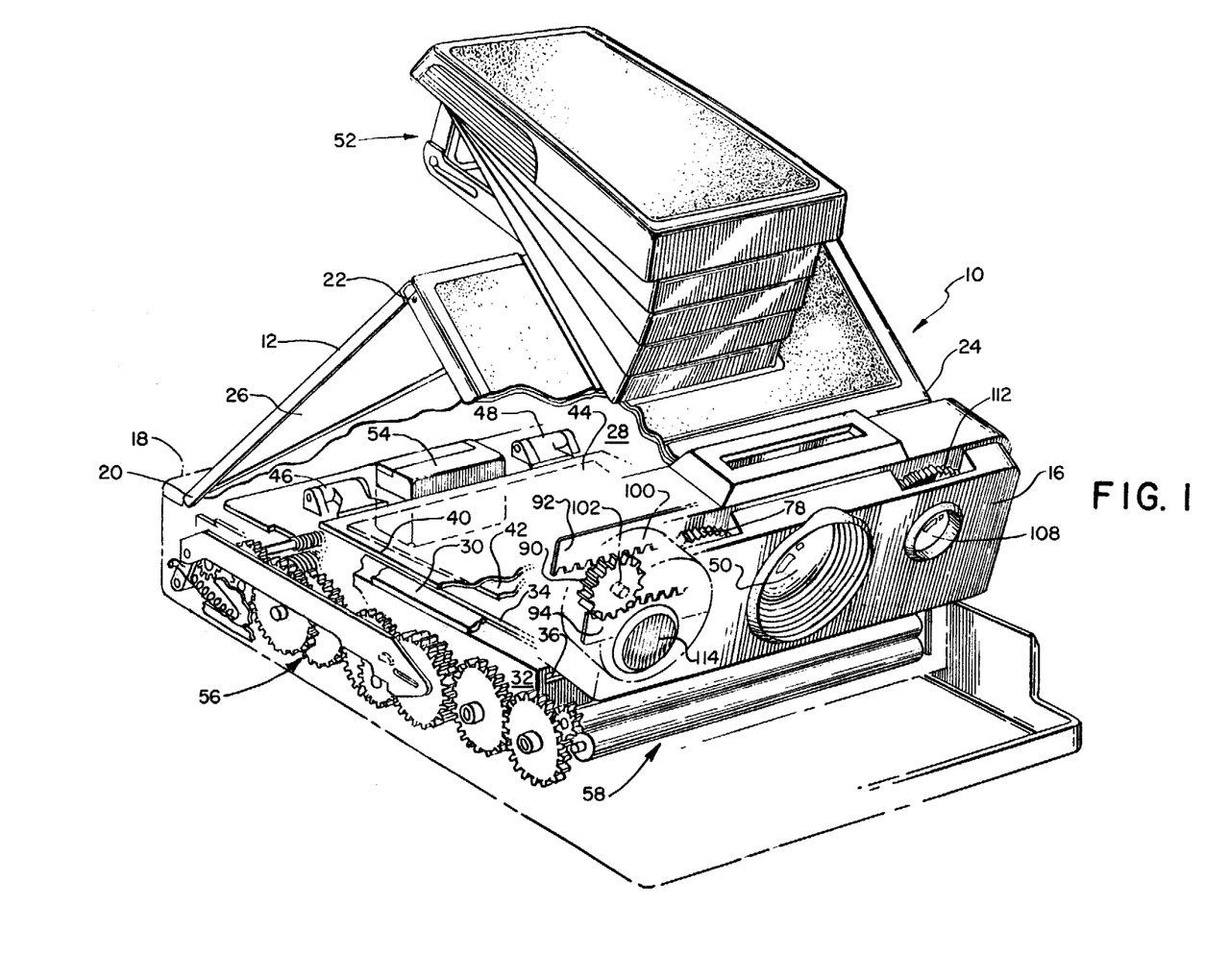
FIG. 1 is a perspective representation of a fully automated photographic camera within which the exposure control system of the instant invention may be incorporated, the figure having portions cut away or revealed in phantom to show internal structure.

While retaining utility for use within a broad variety of photographic devices, the exposure control system of the invention also is ideally suited for use within a fully automatic single lens reflex type of camera. Referring to FIG. 1, the salient components and features of one such camera are revealed. Portrayed generally at 10, the automatic camera is formed of several articulated housing components including a rear wall 12, forward wall 14 and an exposure control housing 16, all of these components being pivotally associated with a base 18 so as to be foldable thereinto in mesting fashion. The specific hinge connections providing for the articulated structure, while not being visible in the figure, are positioned at axes 20, 22, 24 and the lower rear portion of exposure control housing 16. Rear wall 12, forward wall 14 and exposure control housing 16 combine in conjunction with an opaque flexible bellows, a fragment of which is illustrated at 26, to define an exposure chamber generally depicted at 28.

Base 18 includes an inner frame assembly, a portion of which is shown at 30. Inner frame assembly 30, as well as the outward portions of base 18, cooperate to provide structural support for numerous instrumentalities of the camera. For instance, frame 30 is configured to define a receiving chamber for retaining and securing a film laden cassette 32 at the bottom of exposure chamber 28. Cassette 32 is of generally flat configuration and contains a stacked assemblage of photographic film units, the uppermost one of which is positioned at an exposure plane immediately beneath inner frame 30. This exposure plane is located at the underside of a ridge 34 of cassette 32. The forward wall of cassette 32 is formed having an elongate slot 36 disposed thereacross. Slot 36 serves as an egress means providing for the sequential removal of each film unit following its exposure.

Camera 10 operates in modified reflex fashion, being convertible between viewing-focusing and exposure operational modes or orientations by a reflex assembly including a somewhat planar reflex reflecting component 40. Shown in an orientation for viewing and focusing, component 40 is configured having a mirror surface 42 mounted upon its underside and a viewing surface 44 positioned on or forming its upward surface. Connection of assembly 40 to inner frame 30 is provided by rearwardly disposed hinges as at 46 and 48.

In the viewing-focusing orientation shown, component 40 is positioned over ridge 34 of cassette 32 to secure the exposure plane of the camera and to provide for the establishment of a viewing optical path. This path extends from a taking lens at 50, thence to the reflecting surface of a mirror (not shown) affixed to the underside of rear wall 12, thence to viewing surface 44 from which it ultimately extends to a collapsible optical viewing assembly depicted generally at 52. A configuration suited for viewing surface 44 is described in U.S. Pat. No. 3,690,240, while the assembly 52 and its related internal components are described in a copending application for U.S. patent by James G. Baker, filed Dec. 15, 1970, entitled "Reflex Camera and Viewing Device", Ser. No. 98,356, and assigned in common herewith, now abandoned and replaced by application Ser. No. 264,933, now U.S. Pat. No. 3,783,764, issued on Jan. 8, 1974.

In the course of a photographic cycle, following focusing and viewing, the above-described optical path orientation is altered by a procedure wherein exposure chamber 28 is initially secured by blocking the optical path at an exposure control mechanism within housing 16, then by spring driving assembly 40 such that it pivots about hinges 46 and 48 into a position substantially abutting against the inner surface of rear wall 12. In this exposure mode orientation, the optical path then extends from taking lens 50 and the noted exposure mechanism to mirror 42 positioned on the underside of reflex component 40, thence to the uppermost one of the film units positioned beneath ridge 34 of cassette 32. Following a controlled exposure of this uppermost film unit, exposure chamber 28 again is secured by an exposure mechanism within housing 16, following which reflex assembly 40 is drivably returned to its viewing-focusing position wherein the exposure plane of camera 10 again is secured. Once so secured, the exposure mechanism within housing 16 assumes an open orientation permitting viewing and focusing for a next ensuing photographic cycle.

As described in detail in U.S. Pat. No. 3,714,879, movement of reflex assembly 40 is carried out by select actuation of various instrumentalities including an electric drive motor as at 54 operating in conjunction with a mechanical actuating system including spring drives and an elongate gear train shown generally at 56 extending along one side of base 18. During operational mode conversion following an interval of exposure, as reflex assembly 40 is returned to its viewing-focusing orientation, gear train 56 serves to power the mechanical components required to remove an exposed film unit and process it through the rolls of a processing station depicted generally at 58. Film units which may be utilized with camera 10 are described, for instance, in U.S. Pat. No. 3,672,890.

Figure 2:
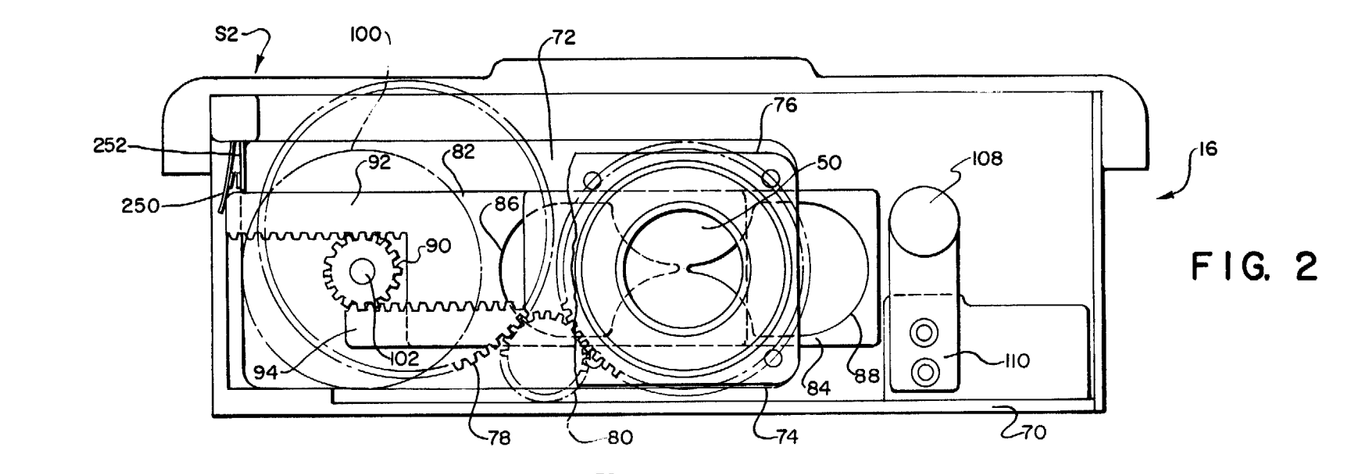
FIG. 2 is a front sectional view of an exposure control mechanism for the camera of FIG. 1 which may utilize the system of the instant invention.
Figure 3:
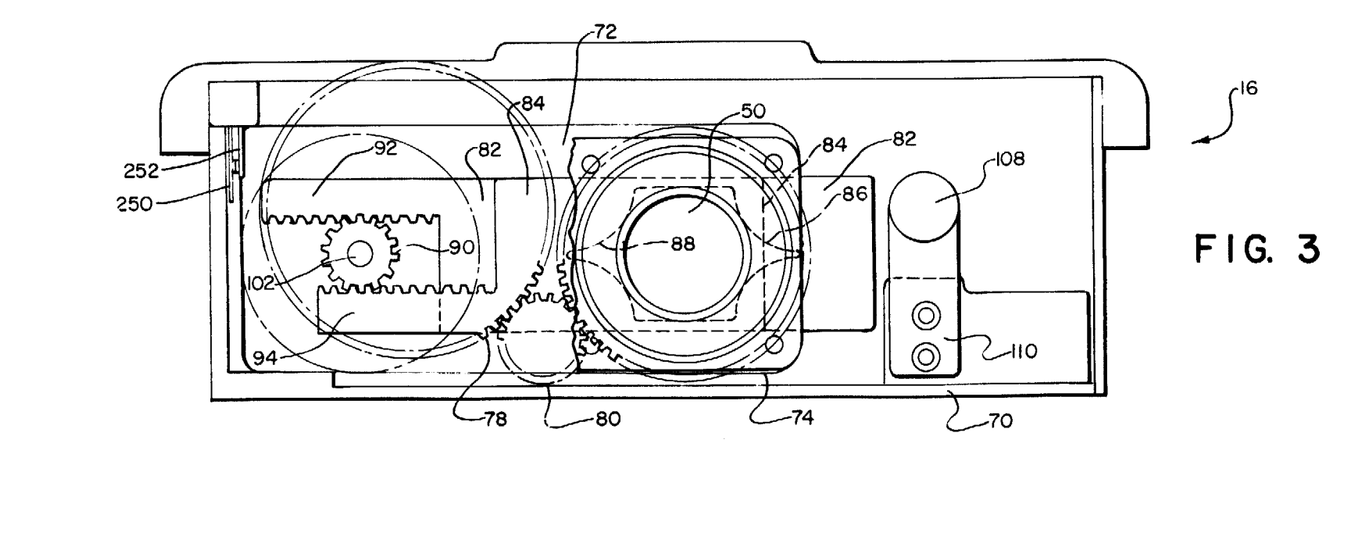
FIG. 3 is another view of the exposure control mechanism of FIG. 1 showing the components thereof as they are oriented to define an aperture of maximum width.
Figure 4:
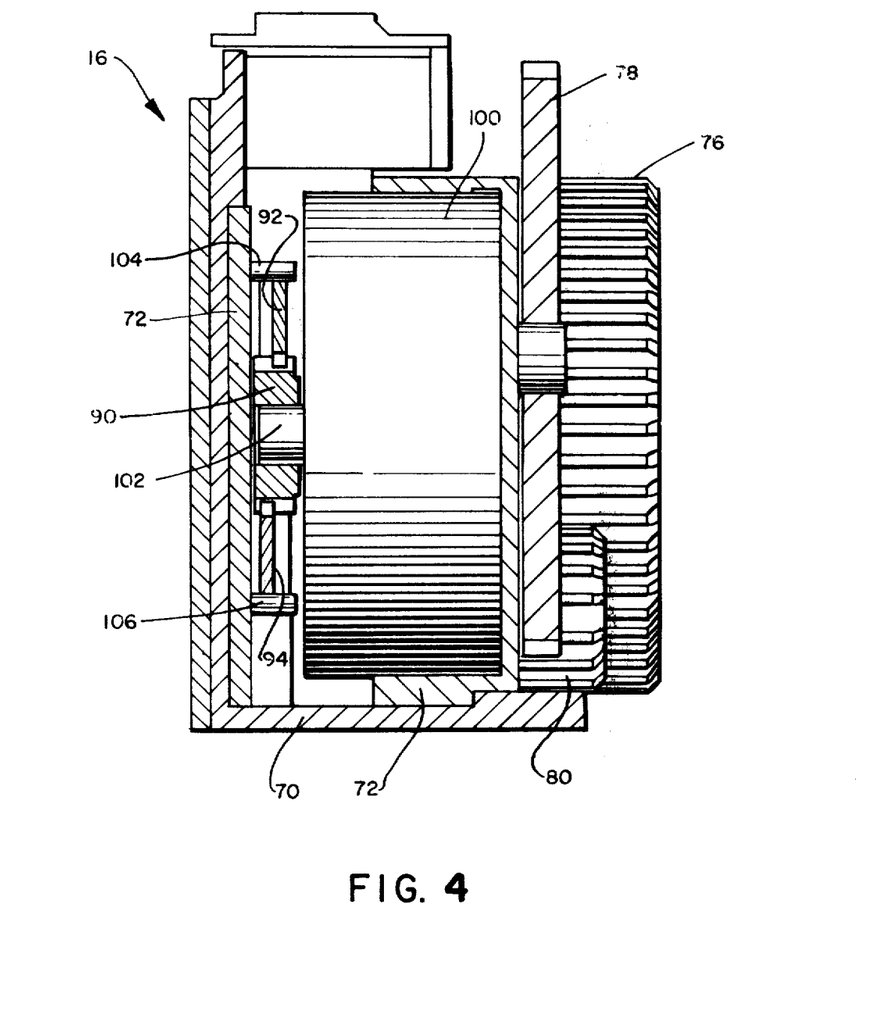
FIG. 4 is a partial side sectional view of the mechansim of FIGS. 1, 2 and 3.

Referring to FIGS. 2-4, the structure of a preferred exposure mechanism for use within exposure housing 16 of camera 10 is revealed in detail. Exposure housing 16 is formed having a rear casting 70 serving as a principal support for the components therewithin. More particularly, the center and one side portion of rear casting 70 serve to support a compound mounting fixture including an exposure mechanism mounting plate 72 which, in turn, supports a lens mounting bracket 74 at the center of housing 16. Bracket 74 serves to support an externally geared bezel 76 which is rotatable to carry out the focusing of taking lens 50. Focusing movement of lens bezel 76 is derived from a hand-manipulated externally geared, focusing wheel shown in outline form in FIGS. 2 and 3 at 78. Focusing wheel 78 is interconnected with the geared periphery of bezel 76 through an idler gear 80.

The rearward portion of lens mounting bracket 74 also serves to support two coacting exposure mechanism blades or elements 82 and 84. Blades 82 and 84, respectively, are formed having tapered aperture defining openings 86 and 88 which symmetrically overlap about the optical path of camera 10 or about the center of taking lens 50 to define an aperture opening. The requisite mutually reversed, synchronous and corresponding movements of blades 82 and 84 is realized by virtue of their common geared interconnection with a drive pinion 90. Note in this regard that blade 82 is formed having a rack extension 92, the geared teeth within which are meshed with those of pinion 90. Correspondingly, blade 84 is configured having a rack extension 94, the gear teeth within which are meshed with pinion 90 on an opposite side thereof from extension 92.

Rotational drive is imparted to pinion 90 from a stepper motor 100, the output shaft 102 of which is fixedly journaled within pinion 90. As is revealed in FIG. 4, motor 100 is of relatively thin dimension and is supported upon mounting plate 72 of the compound mounting fixture. To assure proper enmeshment between pinion 90 and rack extensions 92 and 94, guide pins 104 and 106 (FIG. 4) are provided and are shown extending from a rearward portion of plate 72. As is apparent from the structure described, when motor 100 is selectively energized from an energizing pulse train in the presence of an enabling energization input and an appropriate directional signal, it is capable of driving blades 82 and 84 from an orientation fully blocking the optical path of camera 10 (FIG. 2) toward a terminal orientation of full aperture width as is displayed in FIG. 3. During movement toward the latter terminal position, openings 86 and 88 define a progressive variation of aperture values over exposure opening of the camera.

From the foregoing, it may be observed that a dual parameter exposure regulation can be provided by the mechanism. However, the aperture determining exposure parameter is a predetermined variable until such time as full aperture opening is achieved. At such full opening, the quantum rate of light flux entry through the exposure opening alters to a static value. An exposure interval is terminated by reversing the directional signal input to motor 100 and again energizing it with a drive pulse train to cause blades 82 and 84 to reassume the blocking orientation shown in FIG. 2. The value of exposure defined by the movement of blades 82 and 84 may be regulated by an exposure evaluation arrangement which may be manually derived or determined automatically. For automatic performance, camera 10 includes a light evaluating station having light sensing elements positioned behind entrance optics including lens elements as at 108 supported from bracket 110. As shown in FIG. 1, a form of trim may be utilized in connection with the light sensing station which is manually adjustable by a trim wheel as at 112.

Stepper motors as at 100 generally are motive devices which respond directly to a pulse of specified length and amplitude to provide a drive output. The position of motor shaft 102 is directly proportionate to the number of these excitation or drive pulses applied. Rotational direction for the output of shaft 102 is controlled by electrical shading. Depending upon the use contemplated, the motors generally are designed utilizing multiple coils forming multiple stators, each of which is bifilar wound to allow four to eight stator phases. The rotors usually are formed in permanent magnet fashion having a plurality of pole points. A more comprehensive description of stepper motors as they are used in conjunction with exposure mechanisms is provided in the earlier noted copending application for U.S. patent application Ser. No. 362,926. In that application for patent, a stepper motor having a step angle of about 7½° operating to drive exposure mechanism blades between their terminal positions under about a twenty pulse energization in each direction is described as being adequate for the purpose at hand. A digital technique advantageously is utilized in controlling the operation of motor 100 to cause the exposure mechanism both to operate within the automatic reflex cycle described above as well as to regulate exposure.

Figure 5:
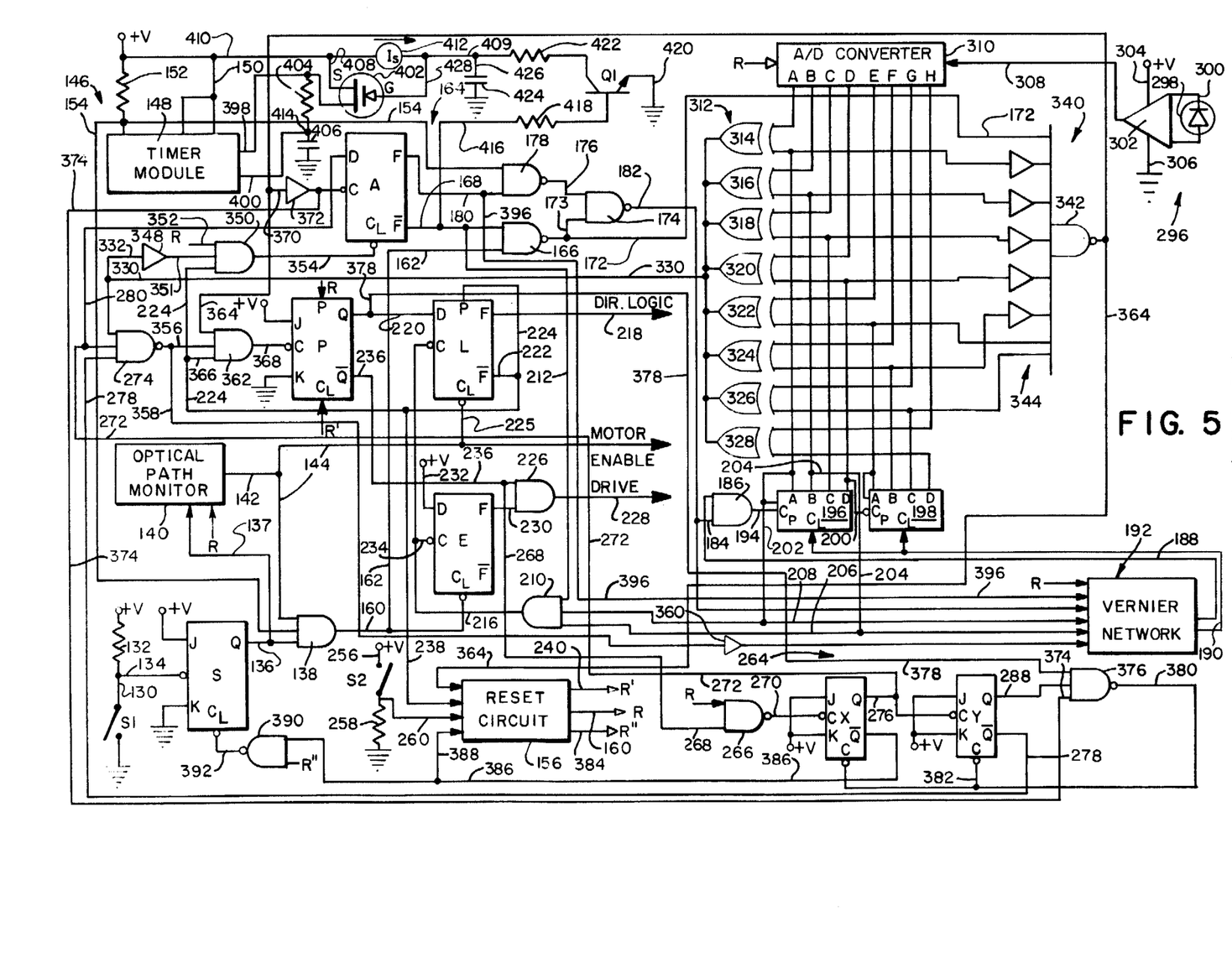
FIG. 5 is a schematic diagram of a control logic circuit incorporating the features of the instant invention.
Figure 6:
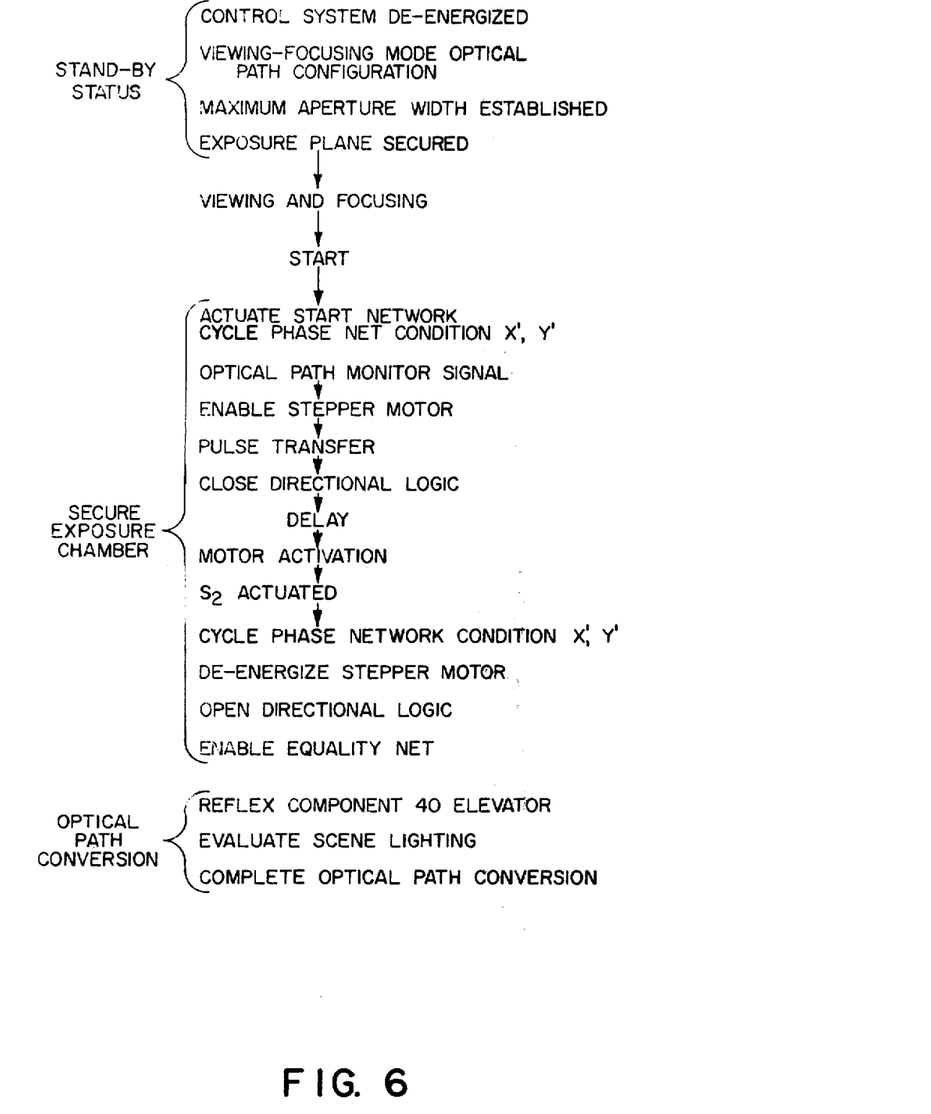
FIGS. 6 and 6A combine to form a chart showing the sequence of operational events carried out by the circuit of FIG. 5 in conjunction with the camera and exposure mechanism of FIGS. 1-4, the top of FIG. 6A being intended to continue from the bottom of FIG. 6.
Figure 6A:
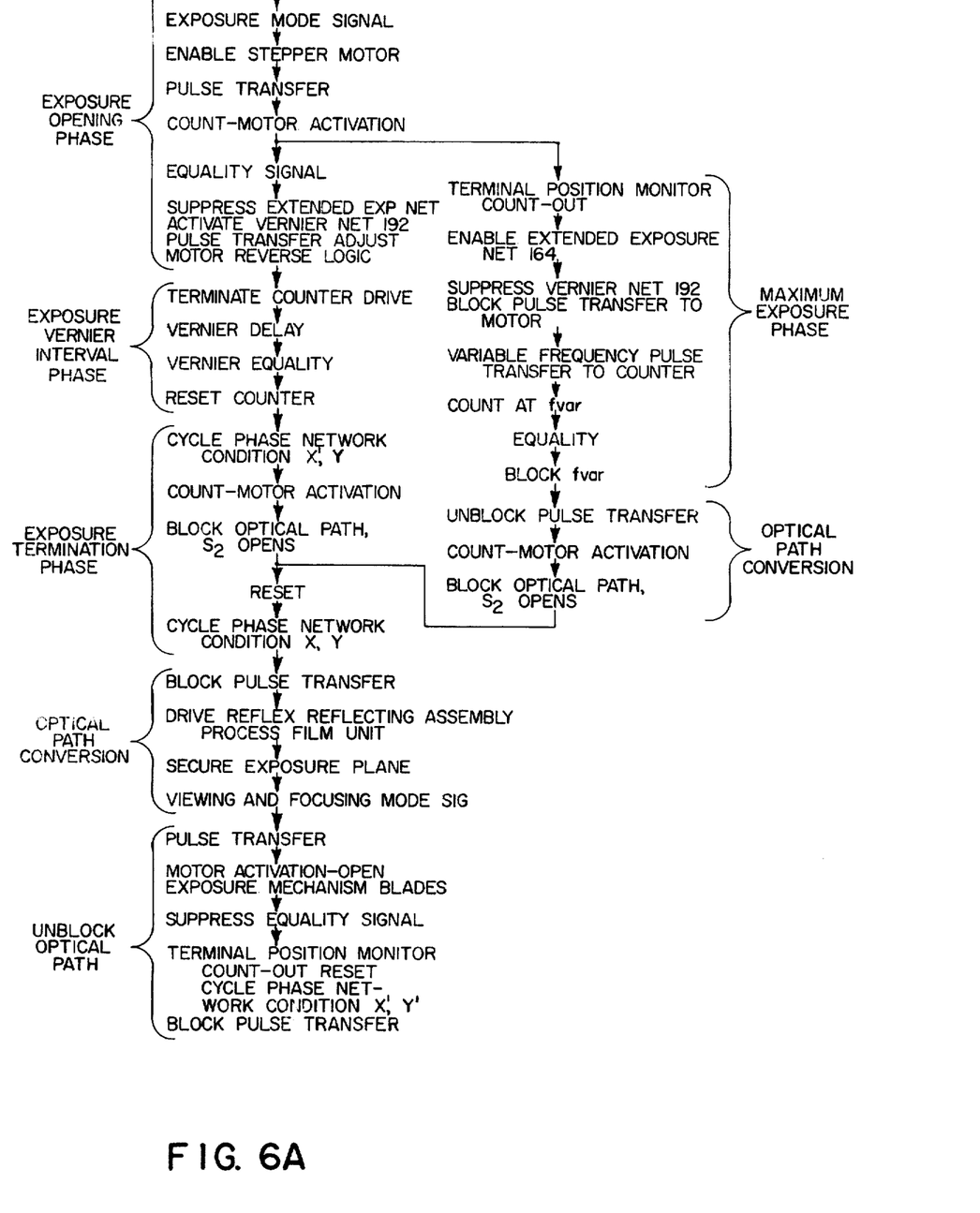

Looking to FIGS. 5, 6 and 6A, the digital circuitry for carrying out the selective action of motor 100 are illustrated respectively by schematic diagram and operational event chart. To facilitate the description of the circuit of FIG. 5, Boolean numeration may be utilized in addition to corresponding voltage signal values. In the latter regard, a "low" signal is considered to be one having a potential essentially at ground and may be represented by a logical "0". Conversely, a "high" signal is considered positive and may be depicted by a logical "1".

The circuit also will be seen to utilize bistable multivibrators. One form of such multivibrator is conventionally referred to as a J-K flip-flop. Generally, a J-K flip-flop is a complementing flip-flop having two added control signals, arbitrarily designated J and K, that serve to limit the conditions under which the flip-flop will change to the 1 and 0 states, respectively. This flip-flop also is characterized in providing an output change in time on the negative transition of clock inputs. The P or preset input, representing a d.c. set input to a given flip-flop, will cause its corresponding Q output to be a logical 1 where such P input is ground. A d.c. reset or clear input to a given such flip-flop will cause its Q output to be a logical 0 when that input is at ground potential. Of course, this output is in complement with its corresponding "not Q" or $\overline{Q}$ output.

Concerning the particular output logic of each of the J-K flip-flops, the Q output of such flip-flop will switch from a 0 state to 1 state when J is 1 at the time of a clock or actuating pulse, although if the flip-flop is already in the 1 state, that is "reset", the binary value of J will not affect the flip-flop. Analogously, the flip-flop will switch from the 1 state at its Q terminal to a 0 state, while its $\overline{Q}$ will transition to 1 at such time as the K input is 1. When both the J and K terminals are 0, clock or actuating pulses will have no effect on the flip-flop.

The circuit also utilizes a D form of flip-flop. This flip-flop has an actuating (clock) input signal terminal C as in a J-K flip-flop, but instead of the J and K input terminals, a single input terminal D is provided. The flip-flop output signal F becomes 1 or 0 according to whether D is 1 or 0, respectively, at the time of a 0-to-1 change in C. In effect, when utilized in a circuit in conjunction with J-K flips-flops, a D flip-flop serves to provide a pulsewidth lag feature.

To further facilitate the description to follow, the "Q" or "F" output of any flip-flop will be designated by the label of the particular flip-flop when it holds a 1 value, while the "$\overline{Q}$" or "$\overline{F}$" output of a given flip-flop may be designated by the label prime (') of the flip-flop where such output is at a 1 value.

As illustrated in FIG. 6, at the commencement of a photographic cycle, camera 10 is retained in a standby status wherein its control system is de-energized, its optical path is in a viewing-focusing configuration, blades 82 and 84 of the exposure mechanism define an aperture of maximum width and its exposure plane is secured or covered by reflex reflecting assembly 40. Such component orientation is altered as the operator of the camera depresses a start button, for instance as depicted at 114 in FIG. 1. This actuation serves to close a switch designated $S_1$ in FIG. 5 which is coupled within line 130 between ground, a current limiting resistor 132 and a voltage source +V. When closed, switch $S_1$ serves to actuate a start network by introducing a high-to-low signal along line 134 to the clock input terminal of a J-K flip-flop S. As a consequence, flip-flop S toggles to exhibit a high value at its Q output which is coupled, in turn, to line 136. This high at line 136 is introduced to one input terminal of an AND gate 138. Simultaneously with the closure of switch $S_1$, another logic input to the circuit is generated. More particularly, an optical path monitor network, as designated generally at 140, generates a high output signal at line 142 in response to the insertion thereinto of the high signal at line 136 through line 137. The corresponding high signal at line 142 represents that reflex reflecting assembly 40 is in a position securing the exposure plane of the camera. An optical path monitoring arrangement as at 140 is described in detail in a copending application for U.S. patent by J. P. Burgarella, P. P. Carcia and R. C. Kee, entitled "Photographic Control System And Apparatus Having Self-Monitoring Features", filed Dec. 29, 1971, Ser. No. 213,303 and assigned in common herewith, now U.S. Pat. No. 3,774,516, issued on Nov. 27, 1973. The high signal at line 142 is introduced through line 144 to the input of AND gate 138 and also to an enabling network (not shown) serving to provide power for motor 100. Accordingly, the motor is enabled to operate in the presence of an energizing pulse input and a directional logic input.

The application of power to the circuit also serves to activate a pulse train generating network depicted generally at 146. Network 146 includes, inter alia, a timer module 148 coupled to +V from line 150 and load resistor 152. Module 148 generates a square wave pulse train at line 154 having a predetermined frequency, $f_1$. In practice, this frequency may be selected as about 2–3 Khz. Line 154 is coupled to a third input of AND gate 138.

With the initial application of power to the control circuit, a reset circuit, designated functionally by block 156 is activated. This circuit generates an electrical transition which serves to align various elements of the circuit, thereby assuring their proper output state at appropriate times within a photographic cycle. One output of reset circuit 156 is represented at line 160 by an arrow and the letter "R". To simplify the circuit drawing, the transition at line 160 is represented wherever it is introduced within the circuit by a similar R associated with an arrow.

The presence of high or 1 values at lines 136 and 144 serves to gate or pass the energizing pulses at line 154 through gate 138 to lines 160 and 162. Line 162 leads, in turn, to an extended exposure control network depicted generally at 164. Note in this regard, that line 162 extends to one input of a NAND gate 166. The opposite input at line 168 to gate 166 is high at this time and is derived from the $\bar{F}$ output terminal of a D flip-flop A. Accordingly, gate 166 passes the pulse train to its output line 172. Line 172 leads through line 173 to the input of another NAND gate 174. The opposite input to gate 174 is high at this time and is present at line 176. Line 176 extends from the input of gate 174 to the output of another NAND gate 178. One input at line 180 to gate 178 is low at this time by virtue of its connection to the F output terminal of flip-flop A. Accordingly, during the instant phase of a photographic cycle, network 164 passes the pulse train from line 162 in unhindered fashion along lines 182 and 184 to one input of AND gate 186. The opposite input to AND gate 186 is high at this time and is introduced from line 188 extending from the output of a vernier network 192. Network 192 serves to provide an interstep correction of the exposure derived from the multistep positioning of blades 82 and 84 by motor 100. The network is described in detail in the above-identified application for U.S. patent by J. W. Stempeck, Ser. No. 414,886. The signal at line 188 is high at this time by virtue of the activation of network 156 with the application of power to the entire circuit.

The high input to gate 186 from line 188 serves to permit the gating or passage of a pulse train at frequency, $f_1$, from line 184 through line 194 to serially paired four-bit binary or "ripple through" counters 196 and 198.

Forming part of a comparison network, the counters 196 and 198 respond to and, in binary manner, monitor and record the number of pulses ($f_1$) being introduced from line 194. The resultant count of counters 196 and 198 is represented as output bit information at their respective output terminals A–D. Note that counters 196 and 198 are serially coupled by interconnecting most significant output bit D at counter 196 through line 200 to the clock input terminal $C_p$ of counter 198.

The least significant and next more significant output bit terminals A and B of counter 196 are tapped, respectively, by leads 202 and 204 which, respectively, are coupled with lines 206 and 208. Lines 206 and 208 are connected to two of the inputs of a three-input AND gate 210. The third input to gate 210 is high at this point in a photographic cycle and is introduced from along line 212 which, in turn, is coupled with line 168 of extended exposure network 164. Inasmuch as lines 202 and 204 are coupled with terminals A and B of counter 196, a pulse train is developed at lines 206 and 208 having a frequency, $f_2$, representing a submultiple of the frequency at pulse train generating network 146. For instance, in the arrangement shown, this frequency, $f_2$, is one-fourth of the frequency, $f_1$. With the presence of a high signal at line 212, the pulse train at frequency $f_2$ is passed through AND gate 210 to line 216.

The pulse train at frequency $f_2$ at line 216 is used ultimately to drive stepper motor 100; however, prior to its introduction to the motor, a high directional logic signal is introduced to the directional control network thereof from line 218. Line 218 is coupled to the F output terminal of a D flip-flop designated L. The D input terminal of flip-flop L, in turn, is coupled through line 220 to the Q output terminal of J-K flip-flop P. Note that the J input terminal of flip-flop P is connected to +V and its preset terminal P is coupled to respond to the output of reset circuit 156. Accordingly, at the commencement of a photographic cycle, a 1-to-0 transition is witnessed at preset terminal P which causes output Q of flip-flop P to assume a 1 state. Line 216 from gate 210 is coupled to the clock input C of flip-flop L. Therefore, with the presence of the initial pulse of this train, the high value at line 220 is "clocked" or passed through flip-flop L to provide the necessary high output at line 218. Motor 100 has now received a directional logic signal for causing blades 82 and 84 to be driven to a fully closed orientation. As the high value is derived at the F output terminal of flip-flop L, its corresponding terminal $\bar{F}$ converts to a low or 0 value, which signal is witnessed through lines 222 and 224 at preset terminal P. Inasmuch as the preset input terminal P of flip-flop L is held at a 0 or low value, the high output at line 218 is "clamped" at that value. Such clamping is available inasmuch as the clear terminal $C_t$ is coupled to the high value at line 144 through line 225.

The pulse train to drive motor 100, ultimately, is gated through AND gate 226, thence to the motor from along line 228. However, gate 226 is connected so as to block such passage until assurance is had that a reversing or high signal has been developed at line 218. One input to gate 226 is present at line 230, which, in turn, is coupled to the output terminal F of D flip-flop E. The D input terminal of flip-flop E is coupled through line 232 to +V, while its clock input C is connected with pulse train line 216 through line 234. Accordingly, upon receipt of one of the pulses at line 234, flip-flop E passes a high value at line 232 to be present at line 230. The opposite input to gate 226 at line 236 is low at this time in consequence of its connection with the $\bar{Q}$ terminal of J-K flip-flop P. This output at line 236 is altered to a high value at such time as the $\bar{F}$ output terminal of flip-flop L transitions to a low value with the alteration of its corresponding F terminal to a high. This low value, as witnessed at line 222, is introduced through lines 224 and 238 to reset circuit 156. Such introduction to circuit 156 serves to provide a selective resetting transition represented at line 240 extending therefrom and identified as R'. This resetting signal, R', is witnessed at the clear terminal, $C_L$, of J-K flip-flop P. Accordingly, flip-flop P toggles to produce a high at line 236, thereby causing gate 226 to pass the energizing pulse train along line 228. As is noted in FIG. 6, the above-described development of directional and drive signals at lines 218 and 228 serve to provide a form of delay intermediate to the directional logic supplied to the motor and its activation from a pulse train.

Flip-flop E serves the particular purpose of adjusting the width of pulses asserted along line 228 to drive motor 100. Note in this regard that the flip-flop is clocked at frequency $f_2$ from gate 210, while it is cleared at frequency $f_1$ from along line 160. With this arrangement, the width of pulses at frequency $f_2$ submitted to motor 100 are narrowed. Such narrowing serves to elongate the interpulse interval sufficiently to assure that the directional signal developed at line 218 will precede a drive pulse at line 228.

Blades 82 and 84 are driven toward their fully closed position shown in FIG. 2 and, as the blades approach this closed orientation, extension 92 of blade 82 contacts resilient leaf 250 of a normally closed switch $S_2$. Leaf 250 is mounted in cantelever fashion from an insulative base 252, fixed, in turn, to rear casting 70. With such contact, leaf 250 is moved from electrical contact with resilient leaf 254 also extending downwardly from base 252.

Returning to FIG. 5, switch $S_2$ will be seen to be reproduced as coupled within a line 256 between +V, a resistor 258 and ground. The resultant low transition at line 260 is witnessed by reset circuit 156 to, in turn, produce a pulse or transition at its output 160. In consequence, the appropriate components of the circuit are reset including a cycle phase network depicted generally at 264. Network 264 serves the function of monitoring the exposure mechanism operation of the circuit and develops, inter alia, an output representing the commencement and termination of an interval of exposure. In this regard, the reset transition at line 160 is witnessed at one input to NAND gate 266 of network 264. The opposite input to gate 266, present at line 268, is coupled through line 236 to the $\overline{Q}$ output of J-K flip-flop P. Input line 268 is high during the operation of motor 100 as is the reset input R from line 160. At such time as switch $S_2$ is opened, the reset input to gate 266 transitions from high to low to high (1-0-1) to, in turn, cause the output of gate 266 at line 270 to transition from low to high to low (0-1-0). Line 270 is coupled to the clock input C of J-K flip-flop X. Both the J and K input terminals of flip-flop X are coupled to +V, consequently, with the receipt of a clocking pulse at line 270, the Q output thereof transitions to a high value. This output is connected through line 272 to a three input NAND gate 274. The signal at line 272 will be seen to enable gate 274 to pass an equality signal derived in conjunction with the operation of counters 196 and 198. The Q output terminal of flip-flop X is coupled along lines 276 and 272 to the clock input C of J-K flip-flop Y. The J and K terminals of flip-flop Y are coupled to +V, while its $\overline{Q}$ output is coupled through line 278 to another input of three input NAND gate 274. Flip-flop X also supplies a high input signal through line 280 to the D input terminal of flip-flop A. This serves to enable extended exposure network 164. Inasmuch as flip-flops X and Y are of a ripple through variety, the noted transition at line 270 does not effect a toggling of flip-flop Y.

The conditions of flip-flops X and Y may be represented in Boolean fashion throughout the various operational phases of a photographic cycle. For instance, at the commencement of a cycle when blades 82 and 84 are being driven towards their initial closed orientation, the output condition of these gates may be represented as X', Y', while in the ensuing optical path conversion as well as exposure phases, the flip-flops assume a condition denoted as X, Y' (See FIG. 6).

The switch $S_2$ development of a reset signal at line 160 from network 156 also causes optical path monitor network 140 to convert its output signal at line 142 from a high to a low value. As a consequence, the input pulses introduced from line 154 to AND gate 138 are blocked. Energizing drive pulses to motor 100 at line 288 are, in turn, blocked. Motor enable line 144 assumes a low value to de-energize the stepper motor network. The low signal at line 144 also is witnessed through line 225 at the clear input terminal of flip-flop L. The effect of this clearing is to cause its $\overline{F}$ output to transition from a 0 to a 1 which, in turn, removes the clamp at preset terminal P thereof to cause the F output terminal to assume a 0 condition. This 0 status at line 218 provides directional logic for causing motor 100 to drive blades 82 and 84 toward their fully open orientation.

The exposure control system now operates to provide optical path conversion wherein reflex reflecting component 40 is spring driven to an exposure orientation against rear wall 12 of camera 10. As noted in FIG. 6, as reflex component 40 elevates, scene lighting is evaluated.

Returning to FIG. 5, as camera 10 converts between a viewing-focusing mode and an exposure mode, a light sensing network depicted generally at 296 which may form part of an exposure evaluating function, commences to evaluate scene lighting and produce a steady-state voltage level signal representative thereof. Network 296 includes a photosensing element in the form of a silicon photodiode 298 which is coupled within line 300 between the input terminals of a logarithmic amplifier 302. Amplifier 302 is connected to +V through line 304 and to ground through line 306. The photodiode 298 is positioned behind the entrance optics of camera 10 as shown at 108 in FIG. 1. The output of amplifier 302 is present at line 308 and is introduced to analogue-to-digital converter 310. Converter 310 responds to steady-state voltage levels produced at line 308 to convert them to a proportionate binary representation. This generally is carried out through comparison networks and the like and the binary representation is presented at output terminals A–H. Converter 310 is enabled from reset circuit 156 with the actuation of switch $S_2$. Through the use of a logarithmic amplifier at 302, lower binary numbers will be produced at converter 310 in response to higher scene brightness levels.

The output terminals A–H of converter 310 are coupled, as shown, to an equality network depicted generally at 312 as well as with counters 196 and 198. Network 312 is formed as an array of Exclusive-OR gates 314–328, one input terminal of each being coupled to a respective output terminal A–H of converter 312. The opposite input terminals of gates 314–328, respectively, are connected with output terminals A–D of paired counters 196 and 198. With the arrangement, when the outputs of counters 196 and 198 reach binary equality with the exposure evaluation binary value at converter 310, a high signal value will be witnessed at output line 330 of equality network 312. Line 330 extends to line 332 which, in turn, is connected with the third input to NAND gate 274. As described earlier, the remaining inputs to gate 274 derive from cycle phase network 264 which inputs are high at this point in a photographic cycle. Accordingly, any high output at line 332 representing an equality signal will be passed through gate 274.

As shown in FIG. 6A, upon completion of optical path conversion, camera 10 enters an exposure opening phase in which blades 82 and 84 are driven by motor 100 toward open aperture orientations. This phase is commenced with the development of an exposure mode signal at line 142 from optical path monitor 140. The resultant high at line 144 serves to enable the stepper motor network and provides an input to gate 138 to again permit passage of pulses from line 154. A resultant high signal at line 225 removes the early asserted clearing state. The pulse train from line 154 is witnessed at line 160 which, as before, extends through network 164 and along lines 182 and 184 to an AND gate 186. The high value at line 188 remaining high, the pulse train at line 184 passes gate 186 and is introduced through line 194 to paired counters 196 and 198. Counters 196 and 198 commence to count and continue to do so until the binary value of their output terminals A–D reaches equality with the binary evaluation at converter 310. Simultaneously and in synchronism with this counting, the least significant and next least significant outputs of counter 196 are tapped, as before, by lines 202 and 204. A resultant submultiple pulse train, $f_2$, is introduced through lines 206 and 208 to the input of AND gate 210. The third input to gate 210 is derived, as before, from network 164 through line 212. Gate 210 passes the energizing pulse train along line 216 to the clock input of flip-flop L. Recall that the motor directional logic signal at line 218 is low, having been converted thereto upon the opening of switch $S_2$. The pulse train at line 216 is introduced through line 234 to the clock input of D flip-flop E. As a consequence, a high value signal at line 232 is passed to the F terminal thereof and presented from line 230 to AND gate 226. The opposite input at line 236 of gate 226 remains high. Accordingly, the energizing drive pulses are introduced to motor 100 from along line 228.

The output terminals A–H of A/D converter 310 as well as the corresponding respective output terminals A–D of counters 196 and 198, are coupled to the input of a terminal position monitor network shown generally at 340. Network 340 is formed of multiple input NAND gate 342, the inputs of which are coupled with appropriate output terminals of paired counters 196 and 198. Through the use of an array of inverters as shown generally at 334, gate 342 will respond to a binary valuation or representation at counters 196 and 198 which corresponds with a position of blades 82 and 84 representing their maximum open aperture condition.

In the discussion to follow, the control circuit is described as it operates under conditions wherein an equality condition is reached at network 312 before blades 82 and 84 reach their terminal position. Following that discussion, the circuit is described as it operates under exposure evaluations requiring an exposure interval extending beyond that point in time wherein blades 82 and 84 reach their terminal position.

To accommodate for the possible ambiguity which might arise in the case of a simultaneous derivation of an equality signal at line 330 and a signal at network 340 representing the attainment of terminal position by blades 82 and 84, a select delay amounting to one pulsewidth is inserted in the operation of network 340. In this regard, line 172 is extended to connect with the input of gate 342 along with inverters 344. The signal at line 172 is the inverted pulse drive for the system and, as such, its phase will delay input to gate 342 by a pulsewidth.

Assuming the presence of an equality signal at line 330, this high signal will be presented through line 332 and an inverter 348 to one input of a three input AND gate 350. The reset input to gate 350 at line 352 is high at this time as well as is line 224 extending from the F terminal of flip-flop L. Accordingly, the low output at gate 350 is presented through line 354 to the clear terminal of flip-flop A. The interposition of a low at this terminal renders flip-flop A immune to any inputs at its clock terminal C. Accordingly, network 164 is isolated from activity within the instant photographic cycle.

The high equality signal at line 332 also is introduced to one input of NAND gate 274. Each of the opposite inputs to gate 274 are high at this time. For instance, line 278 extends to the $\overline{Q}$ output of cycle phase flip-flop Y and line 272 extends from the Q output of cycle phase flip-flop X. With the noted inputs, a resultant low signal appears at line 356, representing the output of gate 274. The low signal at line 356 also is witnessed at line 358, is inverted to a high at inverter 360 and is introduced to vernier network 192, thereby activating it. Described in detail in the above-identified application for U.S. Patent application Ser. No. 414,886, network 192 serves to impose a time delay corresponding with any differential extant between the halted orientation of blades 82 and 84 and the exposure value defined by the digital number provided by converter 310.

The low signal at line 356 also is introduced to one input of AND gate 362. A second input to gate 362 is derived from along line 364 extending, in turn, to terminal position monitor 340. Under conditions wherein a terminal position is not reached by blades 82 and 84, the output of gate 342 is high. The third input to gate 362 is derived from lines 366 and 224 which carry a high signal at this time by virtue of their connection with the $\overline{F}$ terminal of flip-flop L through line 222.

With the noted inputs to gate 362, the output thereof at line 368 transitions from a high to a low and is witnessed at the clock input terminal C of flip-flop P. In consequence, flip-flop P passes a high signal to its output terminal Q at line 220. The corresponding output $\overline{Q}$ thereof at line 236 assumes a low value which, in turn, is witnessed at the input of gate 226. Pulse transfer from gate 226 is adjusted in time to permit facile reversal of the drive network of motor 100.

The final drive pulse at line 216 also clocks flip-flop L such that the output thereof transitions to a high to provide for appropriate directional drive of motor 100 at such time as it is activated to move blades 82 and 84 into their light blocking orientation.

When activated as described above, vernier network 192, acting through line 188, generates a low signal at one input of AND gate 186. As a consequence, drive through gate 186 and into counters 196 and 198 is terminated. However, the energizing pulse train at frequency $f_1$ continues to be introduced along line 182 to vernier network 192. Utilizing this higher frequency, network 192 derives a select delay. A high-to-low transition develops at line 190 at the termination of this select delay to clear counters 196 and 198 by virtue of the connection between line 190 and the clear terminals thereof. Accordingly, when an equality condition terminating the noted delay within network 192 is reached, line 188 resumes a high status to permit the gating of pulses through gate 186 in preparation for the exposure termination phase of a photographic cycle.

Inasmuch as line 212 from extended exposure network 164 remains high, the pulse train at frequency $f_2$ derived from counter 196 is transferred along lines 216 and 234 to the clock input C of flip-flop E. Line 236 now carrying a high signal, the pulse train is passed from output terminal F of flip-flop E through line 230 and gate 226 to motor 100 from along line 228. As before, the initial pulse from the train at line 216 serves to clock flip-flop L to provide a preliminary directional logic change at line 218. Also, this actuation establishes a low signal at line 222 or the $\bar{F}$ output of flip-flop L. This low is witnessed through line 238 at reset circuit 156 to derive a reset signal R' at line 240. As a consequence, flip-flop P is reset causing its $\bar{Q}$ output to return to a high providing for the noted high input at line 236 to gate 226 and to assert this same high through line 268 to NAND gate 266 of cycle phase network 264. The consequent signal at line 270 drops to a low thereby clocking flip-flop X to cause its Q output at line 276 to assume a low state. A high-to-low transition at line 276 also serves to clock flip-flop Y such that its Q output assumes a high state. As shown in FIG. 6A, network 264 assumes a condition X', Y.

Motor 100 drives blades 82 and 84 toward their fully closed blocking orientation serving to terminate an exposure.

As blades 82 and 84 reach their terminal position, switch $S_2$ again is opened and the entire circuit is reset. This reset signal R at line 160 represents a 1-0-1 transition which is introduced to the input of gate 266. The output at line 270 inversely transitions to again clock flip-flop X such that its Q output at line 276 transitions to a high value. This transition, in turn, is witnessed at the clock input of flip-flop Y. However, the signal is not clocked through, flip-flop Y retaining a high (Y) condition. The opening of switch $S_2$ also serves to impose a reset input to optical path monitor 140. As before, the output of network 140 at line 142 transitions to a low value. As a consequence of the 1-0 transition at line 225, the $\bar{F}$ output of flip-flop L assumes a high state, while its F output assumes a low state. This results from the interconnection of preset terminal P with the $\bar{F}$ output terminal thereof. Such an arrangement causes the flip-flop to respond to the noted clear terminal signal transition wherein the instantaneous condition exists of F and $\bar{F}$ having high values.

With the closure of blades 82 and 84 and consequent opening of switch $S_2$, optical path monitor function 140 causes motor 54 to be energized to drive reflex reflecting assembly 40 into an orientation wherein the exposure plane of the camera is blocked. This orientation also re-establishes the viewing-focusing optical path of the camera. Concurrently with the noted optical path conversion, an exposed film unit is processed through processing station 58. During this phase of the photographic cycle, the output function 140 at lines 142 and 144 is low to, in turn, block pulse transfer through gate 138.

When optical path conversion and processing is completed, the signal at line 142 converts to a high value to permit the control system to unblock the optical path. Pulse transfer through gate 138 is permitted by virtue of the high value at line 144, while corresponding pulse transfer to counters 196 and 198 takes place, as before, by insertion from line 182.

Inasmuch as the exposure evaluating binary output condition still remains at A-to-D converter 310, the generation of an equality signal from network 312 must be suppressed. This suppression is carried out by virtue of the now low signal value at line 278 as generated at cycle phase network 264. As a consequence, gate 274 prevents passage of any equality signal from network 312.

As shown in FIG. 6A, control over the extent of activation of motor 100 now is provided from terminal position monitor network 340. When counters 196 and 198 reach a binary output at their respective terminals A–D representing full opening of blades 82 and 84, the output at line 364 of gate 342 reverts to a low which, in turn, is introduced to one input of AND gate 362. This signal at line 364 also extends through line 370, inverter 372 and line 374 to one input of NAND gate 376 of network 264. An opposite side of the input to gate 376 is present at line 378 which, in turn, extends to line 220 as it is coupled to the Q output of flip-flop P. Note that the third input to gate 376 is present at line 288 which, by virtue of its connection to the Q output terminal of flip-flop Y is high at this point in the photographic cycle. Output Q of flip-flop P transitions to a high value when line 368 drops to a low value in correspondence with a low transition at gate 342. A resulting high at line 378 causes the output of gate 376 at line 380 to transition to a low value. This low at line 380 is introduced to clear input of flip-flop X as well as through line 382 to the clear input of flip-flop Y. This returns flip-flops X and Y to a condition representing the commencement of a photographic cycle (X', Y').

The low output of gate 342 at line 364 also is introduced to reset circuit 156, circuit 156 combines this signal along with the high signal of flip-flop X to establish a reset transition R'' at line 384. The high value from flip-flop X extends through lines 386 and 388 to circuit 156. This high value at line 386 is introduced on one side of a NAND gate 390. The opposite input to gate 390 is the R'' reset signal developed at circuit 156. In the presence of the 0-1-0 signal at the reset input to NAND gate 390, the output thereof at line 392 converts to a low and is introduced to clear terminal of flip-flop S. In consequence, the Q output of flip-flop S at line 136 drops to a low to block pulse transfer at gate 138. This action terminates the photographic cycle.

In the event that blades 82 and 84 reach a full open orientation before an equality signal is developed by network 312, the control system alters to provide count evaluation at a different frequency valuation, $f_{var}$. This frequency is selected initially to accommodate for the alteration of exposure development from a dynamic one to a static one. For instance, there is no developing aperture value over the exposure opening of the camera at this state of the exposure interval.

The initial indication that the system will now operate in a maximum exposure phase resides in the presence of a low signal at line 364 extending from gate 342 of terminal position monitor network 340. Appearing before an equality signal from network 312, the low signal at line 364 is transmitted through line 370 to be converted to a high at inverter 372 and introduced to the clock input terminal C of flip-flop A. Inasmuch as the D input terminal of flip-flop A is high at this time, reflecting the Q output of flip-flop X, the F output of flip-flop A becomes high and is present at line 180. Through this electrical transaction, the extended exposure network is enabled. Line 180, in turn, is connected through line 396 to vernier network 192. The high signal is introduced to network 192 to impose a form of suppression such that the network will not interpose unwanted signals at a later point in time in the photographic cycle. The enabling input to flip-flop A from gate 342 also serves to block pulse transfer at gates 166 and 210. In this regard, inasmuch as the F̄ output of gate A is low, pulses are blocked at gate 166. Further, inasmuch as line 212 couples gate 210 with line 168, pulse transfer is blocked at gate 210. Motor 100 stops, blades 82 and 84 defining maximum aperture width.

While the pulse train at frequency $f_1$ has been blocked at gates 166 and 210, a pulse drive input continues to be asserted to counters 196 and 198 through gate 186. In this regard, note that line 154 extends to one input of gate 178 of extended exposure network 164. The opposite input to that gate at line 180 being high, the pulse train is passed through to line 176 which, in turn, is coupled to one side of NAND gate 174. Inasmuch as the opposite input at line 173 to gate 174 is high, the pulse train again is passed along line 182 to be asserted at line 184 and gate 186. The opposite input to gate 186 being high, the pulse train is passed for counting.

This extended exposure phase pulse train, however, is one exhibiting a progressively decreasing frequency rate. Such variable rate is derived at network 164. Network 164 is present as a controller circuit which operates during the instant maximum exposure phase as an astable multivibrator. Looking initially to generating network 146, timer module 148 evolves the initial opening phase frequency, $f_1$, by virtue of the connection of its two control inputs at lines 398 and 400 to an RC network incorporating an inhancement mode P channel MOS FET 402, resistor 404 and timing capacitor 406. The source terminal of FET 402 is coupled through lines 408 and 410 to a current supply depicted at 412. The drain terminal of FET 402 is coupled to line 398, while resistor 404 connects within line 414 between line 398 and capacitor 406. The opposite side of capacitor 406 is coupled to ground. Accordingly, during the initial opening phase of an exposure interval, a voltage buildup between capacitor 406, resistor $R_1$ and a channel resistance exhibited at FET 402 serves to establish the time constant for developing the initial output pulse train frequency $f_1$ at timer module 148.

However, with the enabling of network 164 in response to the low output at gate 342, the low exhibited at line 168 from flip-flop A is presented along line 416 and limiting resistor 418 to the base of NPN transistor $Q_1$. The emitter of transistor $Q_1$ is coupled to ground through line 420, while its collector is coupled to resistor 422 at line 409. With the assertion of a low value across the base-emitter junction of transistor $Q_1$, the transistor is turned off and, as a consequence, current from supply 412 is permitted to commence to charge a capacitor 424 connected within line 426 between line 410 and ground. Therefore, a ramp voltage is developed which is witnessed through line 428 at the gate terminal of FET 402. Inasmuch as the source terminal of FET 402 is coupled with +V through line 410, the gate-to-source voltage differential exhibited thereacross gradually diminishes to insert a progressively increasing resistance within the RC network additionally including resistor 404 and capacitor 406. Looking to FIG. 7, the variation in channel resistance at FET 402 ($R_{DS}$) during this portion of the photographic cycle is represented by curve 430. The resultant current asserted in the charging of capacitor 406 is shown at curve 432 and is represented as $I_{DS}$. Note that this curve is parabolic in nature and may be represented by the general equation $I_{DS} = At^2 + Bt + C$, where $t$ = time, $$A = \frac{I_s^2}{C_{424}^2 V_p^2}, \quad B = \frac{2I_{DO}V}{C_{424}} - \frac{2VI_s}{V_p^2 C_{424}}, \quad C = I_{DO} - \frac{2I_{DO}V}{C_{424}} + \left(\frac{V}{V_p}\right)^2,$$

Figure 7:
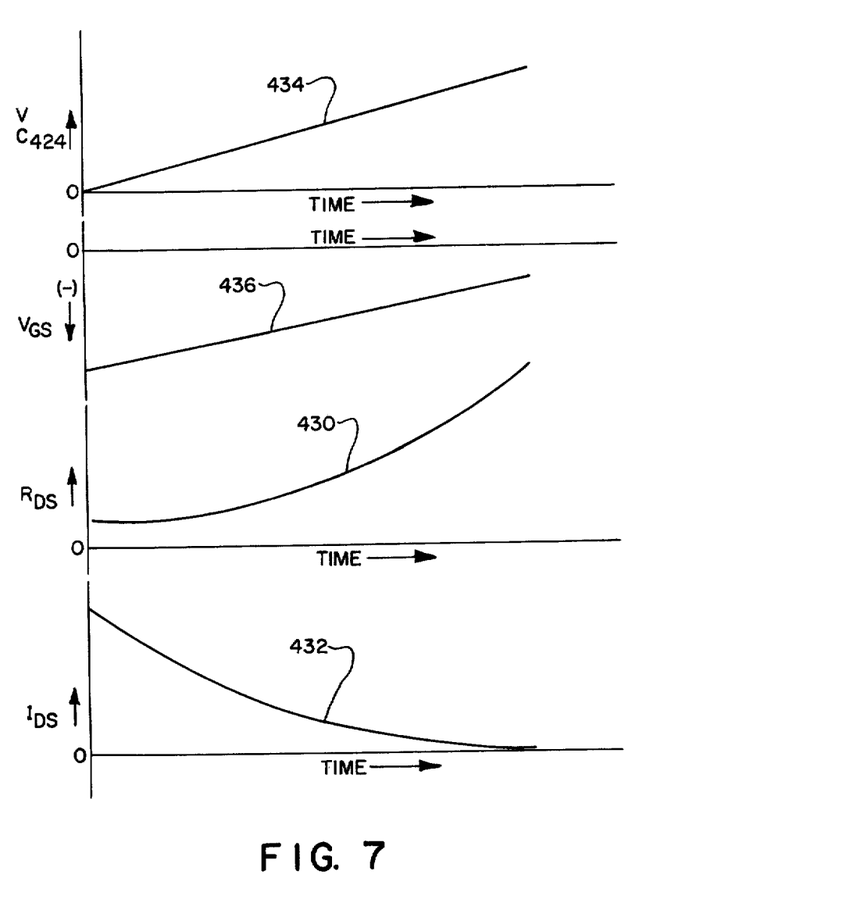
FIG. 7 is a family of curves showing time-dependent characteristic outputs of select portions of a network within the circuit of FIG. 5.

$V$ representing the reference voltage at line 410, $V_p$ representing the voltage at inflection between the ohmic and saturation regions of FET 402, $I_{DO}$ being the drain current flowing when the gate-to-source voltage is zero, $C_{424}$ is the capacitance at capacitor 424 and $I_s$ is the current derived at source 412. The voltage buildup at capacitor 424 is represented in FIG. 7 at line 434, while the resultant gate-to-source voltage of FET 402 as it is effected by the buildup of voltage at capacitor 424 is shown at curve 436. Timer module 148 responds to the variation in voltage buildup by the RC network to progressively alter the frequency rate, $f_{var}$ asserted at counters 196 and 198.

With the arrangement shown, it may be observed that at the instant blades 82 and 84 reach their terminal open position, the variation in frequency introduced to counters 196 and 198 is slight and gradually diminishes thereafter. This slight diminishment at the instant of achieving maximum aperture accommodates for the alteration of exposure definition by blades 82 and 84 from a dynamic to a static condition. Accurate control is effected at this stage as is necessary inasmuch as the light flux entering the exposure opening of the camera at this time represents a significant portion of total integrated light valuation. As an exposure interval extends beyond this point in time, however, the corresponding portion of integrated light flux entry assumes a less and less significant contribution to the total light valuation of the exposure. Accordingly, the counting frequency advantageously may be significantly diminished. This diminishment permits a lowering of the total binary capacity required of A-to-D converter 310 as well as counters 196 and 198. Such efficient utilization of these components of the system allows for a more economic system design.

With the development of an equality signal at line 330 from network 312, frequency, $f_{var}$, of extended exposure network 164 is blocked. This is carried out inasmuch as the high equality signal at line 330 is introduced through line 332, inverter 348 and line 351 to gate 350. A resultant high-to-low transition at line 354 serves to clear flip-flop A, to, in turn, cause its F̄ output at line 168 to assume a high status. Transistor $Q_1$ again becomes forward biased to discharge capacitor 424 and stabililze the channel resistance value at FET 402.

The clearing of flip-flop A also serves to unblock pulse transfer at gates 166 and 210. In consequence, pulse drive is realized at motor drive gate 226 as well as at gate 186 leading to counters 196 and 198. Note, in this regard, that the counting frequency is now at the original rate, $f_1$. Motor 100 is energized to drive blades 82 and 84 into their closed terminal orientation to block the optical path of camera 10. As they reach this terminal position, switch $S_2$ again is opened to reset the circuit as described in detail in connection with the exposure cycle not reaching maximum aperture. As shown in FIG. 6A, the cycle now continues as described earlier to convert the optical path of camera 10, following which conversion motor 100 serves to drive blades 82 and 84 into their fully open orientation in preparation for a next succeeding photographic cycle.

Since certain changes may be made in the above system and apparatus without departing from the scope of the invention herein involved, it is intended that all matter contained in the above description or shown in the accompanying drawings shall be interpreted as illustrative and not in a limiting sense.

I claim:

1. An exposure control system comprising:
   exposure mechanism means selectively movable between a first position in blocking relation to an exposure opening and a second position defining a given aperture value in unblocking relation to the exposure opening, said exposure mechanism means defining a progressive variation of aperture values over the exposure opening when so moved between said first and said second positions;
   drive means energizable to effect movement of said exposure mechanism means between said first and said second position;
   exposure evaluating means having an output the value of which corresponds with an exposure evaluation of a scene;
   converter means responsive to said exposure evaluating means output and operative to derive a digital representation of the said value thereof; and
   control means including:
      counter means responsive to an input pulse train for sequentially counting the received pulses thereof and deriving a time dependent digital representation of the number of said pulses received,
      means when actuated for energizing said drive means to move said exposure mechanism means toward said second position to initiate an exposure interval during which scene light rays pass through the exposure opening and then in response to coincidence between said digital representations of said counter means and said converter means for energizing said drive means to move said exposure mechanism means to block said exposure opening and terminate said exposure interval, said energizing means including generator means for deriving said pulse train input to said counter at one frequency during energization of said exposure mechanism means effecting movement thereof from said first to said second position and at another frequency during location of said exposure mechanism means in said second position so as to vary the time dependent digital representation of said counter as a function of both said variation of aperture values and said given aperture value.

2. The exposure control system of claim 1 in which said generator means is operative to derive said pulse train input one frequency at a predetermined fixed value and said other frequency at one or more values lower than said one frequency.

3. The exposure control system of claim 1 in which said generator means is operative to derive said pulse train input one frequency at a predetermined fixed value and said other frequency at progressively diminishing values with respect to said one frequency value.

4. The exposure control system of claim 1 in which:
   said control means includes monitor means having a unique output condition responsive to said counter means achieving a digital representation corresponding with driving of said exposure mechanism means to said second position; and
   said generator means is responsive to said unique output condition for deriving said pulse train input other frequency.

5. The exposure control system of claim 4 in which:
   said drive means includes a pulse energized motor; and
   said energizing means is operative to pulse energize said drive means motor at a frequency representing a predetermined submultiple of said one frequency and to interrupt said energization in the presence of said unique output condition.

6. The exposure control system of claim 5 in which said submultiple frequency is derived from said counter means so as to selectively energize said motor in slaved relationship with said counter means operation.

7. The exposure control system of claim 4 in which said monitor means is operative to derive said unique output condition subsequent to said coincidence of digital representations when said coincidence occurs as said exposure mechanism means attain said second terminal position.

8. An exposure control system comprising:
   exposure means having at least one light regulating element movable during initiation of an exposure interval to derive a dynamic definition of aperture values unblocking an exposure opening, to then statically define an aperture value at at least one open position, and finally movable to block said exposure opening to terminate said exposure interval;
   drive means energizably by a first sequence of drive pulses to move said exposure means to initiate said exposure interval and a further sequence of drive pulses to move said exposure means to terminate said exposure interval;
   exposure evaluating means having an output the value of which corresponds with an exposure evaluation of a scene;
   converter means responsive to said exposure evaluating means output and operative to derive a digital representation of the said value thereof; and
   control means including:
      counter means operative in response to an input pulse train to count the received pulses thereof and deriving a digital representation of the number of said pulses received,
      generator means for deriving said first sequence of drive pulses to initiate said interval of exposure and a related pulse train input to said counter means to provide synchronous operation between said counter means and said element movement during said initiation of said exposure interval, and responsive to coincidence between said counter means and said converter means digital representations for deriving said further sequence to move said exposure means to terminate said interval of exposure, said generating means deriving said pulse train input to said counter means at one frequency during element movement effecting said dynamic definition of aperture values and at another frequency during said static definition of aperture when said element attains said one open position so as to vary the digital representation of said counter as a function of both said dynamic and said static values of aperture.

9. The exposure control system of claim 8 in which said generator means includes multivibrator means operative to generate said one frequency at a predetermined fixed value and said other frequency at a progressively diminishing rate with respect to said one frequency.

10. The exposure control system of claim 8 in which: said control means includes monitor means having a unique output condition responsive to said counter means achieving a digital representation corresponding to pulsing of said exposure means element to said open position; and said generator means is responsive to said unique output condition for deriving said pulse train input other frequency.

11. The exposure control system of claim 8 in which said generator means includes astable multivibrator means having a pulse train output the frequency of which is responsive to the resistance of an R-C network, said network being configured such that said resistance is at a substantially fixed value during said dynamic aperture definition and varies in predetermined fashion during said static aperture value definition, so as to generate said other frequency at a progressively diminishing rate.

12. The exposure control system of claim 11 in which said R-C network resistance is at least in part developed by the channel impedance of field effect transistor means, and said generator means includes means for effecting the progressive increase of said channel impedance during said exposure means static aperture value definition.

13. The exposure control system of claim 12 in which:
said control means includes monitor means having a unique output condition when said exposure means element reaches said terminal open position; and
said generator means is responsive to said unique output condition for effecting said progressive increase of said channel impedance.

14. The exposure control system of claim 8 in which said control means includes monitor means having a unique output condition responsive to a said counter means achieving a digital representation corresponding with the pulsing of said exposure mechanism means element to said one open position, said generator means being operative in response to said unique output condition to suspend said pulse energization of said drive means until said coincidence of said digital representations.

15. An exposure control system comprising:
exposure mechanism means having at least one light regulating element movable during initiation of an interval of exposure from a position blocking an exposure opening to a predetermined open position to derive a dynamic definition of aperture values unblocking said exposure opening during said movement and a static aperture value when said element attains said predetermined open position, and then movable into said blocking position to terminate said interval of exposure;

exposure evaluating means having an output the value of which corresponds with an exposure evaluation of a scene;

converter means responsive to said exposure evaluating means output and operative to derive a digital representation of the said value thereof;

pulse energized motor means operative in the presence of select directional signals and an input pulse train energization to selectively move said exposure mechanism means element between said blocking position and said predetermined position; and control means including:
counter means responsive to an input pulse train for sequentially counting the received pulses thereof and deriving a digital representation of the number of said pulses received,
position monitor means having a unique output condition responsive to said counter means achieving a digital representation corresponding with sufficient pulsing of said motor to move said light regulating element to said predetermined open position,
generator means for deriving said pulse train input to said counter means at one frequency during movement of said light regulating element to derive said dynamic definition of aperture values and responsive to said unique output condition of said monitor means to derive said pulse train to said counter means at another frequency when said light regulating element is at said predetermined open terminal position to vary the time of achievement of said counter digital representation as a function of both said dynamic and static aperture values, said generation means including means for pulse energizing said motor means at a select synchronous submultiple frequency of said one frequency and for deriving said select directional signals to effect movement of said light regulating element to said predetermined open position so as to initiate said exposure interval and in response to coincidence between said counter means and said converter means digital representation to effect movement of said light regulating element back to said blocking position.

16. The exposure control system of claim 15 in which said generator means is operative to derive said pulse train input one frequency at a predetermined fixed value and said other frequency at a predetermined value lower than said one frequency.

17. The exposure control system of claim 15 in which said generator means is operative to derive said pulse train input one frequency at a predetermined fixed value and said other frequency at a progressively diminishing value with respect to said one frequency value.

18. The exposure control system of claim 15 in which said terminal position monitor means is operative to derive said unique output condition subsequent to said coincidence of digital representations when said coincidence occurs substantially simultaneously with said exposure mechanism means element attaining said terminal open position.

19. The exposure control system of claim 15 in which said pulse energizing means select submultiple frequency is derived from said counter means so as to selectively energize said motor means in slaved relation with said counter means operation.

20. The exposure control system of claim 15 in which said generator means includes astable multivibrator means having a pulse train output the frequency of which is responsive to the resistance of an R-C network, said network being configured such that said resistance is at a substantially fixed value during said dynamic aperture definition and varies in predetermined fashion during said static aperture value definition, so as to generate said other frequency at a progressively diminishing rate.

21. The exposure control system of claim 20 in which said R-C network resistance is at least in part developed by the channel impedance of field effect transistor means, said generator means includes means for effecting the progressive increase of said channel impedance during said static aperture value definition.

22. A method of controlling operation of a photographic shutter arrangement to expose photographic film material comprising:
   initiating an exposure interval during which scene light is passed along an optical path to said film material by displacing a blade arrangement from a blocking position in said path to define in said path progressively changing aperture values through which scene light passes to said film;
   stopping said blade arrangement at a selected location defining a static aperture value to continue said exposure interval;
   defining an exposure value correlated to an evaluation of the scene to be photographed; and
   determining an exposure interval in accordance with said exposure value as a function of both said changing aperture values and said selected aperture value, said determining step including driving a counter synchronously with said exposure initiation to provide progressive counter values, comparing the value of said counter to said exposure value, and in accordance with substantial coincidence between said counter value and said exposure value, driving said blade means to a position blocking said path to terminate said exposure interval, said determining step including driving said counter at a one rate during interval initiating movement of said blade arrangement and at another rate during static position of said blade arrangement at said selected location.

23. The method of claim 22 wherein said determining step includes driving said counter at a fixed rate during initiation of said exposure interval and at a rate of decreasing frequency during said static position of said blade arrangement.

* * * * *